United States Patent
Myers et al.

(10) Patent No.: US 9,446,399 B2
(45) Date of Patent: Sep. 20, 2016

(54) PROCESS FOR REGENERATING CATALYST IN A FLUID CATALYTIC CRACKING UNIT

(71) Applicant: UOP LLC, Des Plaines, IL (US)

(72) Inventors: Daniel N. Myers, Arlington Heights, IL (US); Paolo Palmas, Des Plaines, IL (US); David N. Myers, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/522,946

(22) Filed: Oct. 24, 2014

(65) Prior Publication Data
US 2015/0148214 A1    May 28, 2015

Related U.S. Application Data

(63) Continuation of application No. 13/858,724, filed on Apr. 8, 2013, now Pat. No. 8,883,666, which is a continuation of application No. 12/771,755, filed on Apr. 30, 2010, now Pat. No. 8,415,264.

(51) Int. Cl.
| | |
|---|---|
| *B01J 38/12* | (2006.01) |
| *B01J 29/80* | (2006.01) |
| *B01J 29/90* | (2006.01) |
| *B01J 38/02* | (2006.01) |
| *B01J 38/10* | (2006.01) |
| *B01J 38/72* | (2006.01) |
| *C10G 11/05* | (2006.01) |
| *C10G 11/18* | (2006.01) |

(52) U.S. Cl.
CPC ............. *B01J 38/12* (2013.01); *B01J 29/80* (2013.01); *B01J 29/90* (2013.01); *B01J 38/02* (2013.01); *B01J 38/10* (2013.01); *B01J 38/72* (2013.01); *C10G 11/05* (2013.01); *C10G 11/182* (2013.01); *C10G 2300/107* (2013.01); *C10G 2300/1074* (2013.01); *C10G 2300/70* (2013.01)

(58) Field of Classification Search
USPC ....... 208/183, 203, 223, 228, 229, 301, 305, 208/370; 502/31, 32, 35, 34, 355, 406, 407, 502/410, 411, 450, 467, 820; 585/271, 277, 585/323, 332, 467
See application file for complete search history.

(56) References Cited

U.S. PATENT DOCUMENTS

| | | | | |
|---|---|---|---|---|
| 4,414,098 | A * | 11/1983 | Zandona | C10G 25/05 208/120.1 |
| 4,753,907 | A * | 6/1988 | Zandona | C10G 11/18 208/159 |
| 7,220,351 | B1 * | 5/2007 | Pontier | C10G 11/18 208/113 |
| 7,312,370 | B2 * | 12/2007 | Pittman | C10G 11/18 208/118 |
| 7,727,380 | B2 * | 6/2010 | Couch | C10G 11/182 208/113 |
| 8,753,502 | B1 | 6/2014 | Sexton et al. | |
| 2009/0035191 | A1 * | 2/2009 | Couch | C10G 11/182 422/144 |
| 2011/0021851 | A1 * | 1/2011 | Towler | B01J 20/18 585/251 |
| 2011/0269620 | A1 * | 11/2011 | Myers | B01J 29/80 502/38 |
| 2013/0225396 | A1 | 8/2013 | Myers et al. | |

* cited by examiner

*Primary Examiner* — Jennifer A Smith

(57) ABSTRACT

One exemplary embodiment can be a process for regenerating catalyst in a fluid catalytic cracking unit. Generally, the process includes providing a feed to a riser of a reaction vessel, and providing a stream to a distributor positioned within a void proximate to an inlet receiving unregenerated catalyst in a regenerator. The feed can include at least one of a gas oil, a vacuum gas oil, an atmospheric gas oil, a coker gas oil, a hydrotreated gas oil, a hydrocracker unconverted oil, and an atmospheric residue.

14 Claims, 2 Drawing Sheets

PROCESS FOR REGENERATING CATALYST IN A FLUID CATALYTIC CRACKING UNIT

CROSS-REFERENCE TO RELATED APPLICATIONS

This application is a Continuation of copending application Ser. No. 13/858,724 filed Apr. 8, 2013, which application is a Continuation of application Ser. No. 12/771,755 filed Apr. 30, 2010, now U.S. Pat. No. 8,415,264, the contents of which are hereby incorporated by reference in its entirety.

FIELD OF THE INVENTION

This invention generally relates to a process for regenerating catalyst in a fluid catalytic cracking unit.

DESCRIPTION OF THE RELATED ART

Fluid catalytic cracking can create a variety of products from heavier hydrocarbons. Often, a feed of heavier hydrocarbons, such as a vacuum gas oil, is provided to a fluid catalytic cracking reactor. Various products may be produced, including a gasoline product and/or another product, such as at least one of propylene and ethylene.

Sometimes, fluid catalytic cracking (may be abbreviated as "FCC") units operate with feeds having low sulfur and relatively shorter carbon chain lengths, such as hydrotreated vacuum gas oil feed stocks, which can be referred to as "clean" feeds. Typically, it may be desirable to reduce coke yield from about 6%, by weight, to about 4%, by weight. As such, the liquid products' yield, e.g., light cycle oil, liquid petroleum gas, gasoline, and/or clarified oil, can increase from about 91.5 to about 93.5%, by weight. Processing such clean feeds may create operating challenges due to low regenerator temperatures, which may be a result of the lack of coke on the spent catalyst. Thus, the regenerator can have insufficient heat and run at lower than desired temperatures, such as a range of about 650° to about 670° C. However, at these low temperatures, it can be difficult to burn carbon monoxide to carbon dioxide due to complications, such as afterburning. In addition, catalyst regeneration difficulties may arise that can impact product quality.

One possible solution is burning methane to replace the heat provided by coke, which may provide up to about 15% of the heat duty required by the regenerator. Recently, there has been an emphasis on reducing carbon dioxide emissions due to legal and regulatory requirements. As such, burning methane can reduce carbon dioxide emissions by about 13.1%, by weight. In addition, reducing coke yield from about 5%, by weight, to about 4%, by weight, can reduce carbon dioxide emissions from the regenerator by about 7.9%, by weight.

However, burning methane in the heater of the regenerator may also create other undesirable side effects. These adverse side effects can include creating high gas velocities at the outlet of the direct fired heater resulting in catalyst attrition. Moreover, thermal damage from localized high temperatures can occur deactivating the catalyst. Generally, the temperature ceiling to prevent catalyst damage is no more than about 790° C. Additionally, an air grid at an outlet of the direct fired air heater can limit outlet temperatures to, e.g., about 750° to about 780° C. due to potential metallurgical failures. Thus, firing the heater to add heat to the regenerator can cause unwanted catalyst degradation and possible equipment damage.

Thus, it would be desirable to provide an FCC process receiving clean feeds without having adverse effects as discussed above.

SUMMARY OF THE INVENTION

One exemplary embodiment can be a process for regenerating catalyst in a fluid catalytic cracking unit. Generally, the process includes providing a feed to a riser of a reaction vessel, and providing a stream to a distributor positioned within a void proximate to an inlet receiving unregenerated catalyst in a regenerator. The feed can include at least one of a gas oil, a vacuum gas oil, an atmospheric gas oil, a coker gas oil, a hydrotreated gas oil, a hydrocracker unconverted oil, and an atmospheric residue.

Another exemplary embodiment may be a process for regenerating catalyst in a fluid catalytic cracking unit. The process can include providing a feed to a riser of a reaction vessel and introducing an uncombusted stream, which may include a first stream having oxygen and a second stream having at least one of a hydrocarbon and hydrogen, proximate to an inlet receiving unregenerated catalyst for a regenerator. Generally, the feed includes at least one of a gas oil, a vacuum gas oil, an atmospheric gas oil, a coker gas oil, a hydrotreated gas oil, a hydrocracker unconverted oil, and an atmospheric residue. Usually, the first and second streams are mixed together in a heater before introduction, and the heater does not ignite at least one of the hydrocarbon and hydrogen.

A further exemplary embodiment can be a process for regenerating catalyst in a fluid catalytic cracking unit. The process can include providing a feed to a riser of a reaction vessel, mixing a first stream having air and a second stream having at least one of a hydrocarbon and hydrogen in a direct fired heater to form an uncombusted stream exiting the direct fired heater, and introducing the uncombusted stream proximate to an inlet receiving unregenerated catalyst for a regenerator. Generally, the feed includes at least one of a gas oil, a vacuum gas oil, an atmospheric gas oil, a coker gas oil, a hydrotreated gas oil, a hydrocracker unconverted oil, and an atmospheric residue.

The embodiments provided herein can add the requisite heat to the combustor to facilitate effective operation of the fluid catalytic cracking apparatus. Particularly, at least one of hydrogen and a hydrocarbon, such as one or more $C_1$-$C_5$ hydrocarbons, can be added to the regenerator in an uncombusted state to provide the requisite heat without adverse side effects, such as catalyst attrition, due to excessive velocities created by igniting a fuel gas outside the combustor and routing the oxidation products to the regenerator. In any event, whether hydrocarbon or hydrogen is utilized, preferably in one exemplary embodiment the total volume of hydrogen and hydrocarbon does not exceed about 3%, by volume, based on the volume of the uncombusted stream. In another exemplary embodiment, the at least one of hydrocarbon and hydrogen may be directly supplied to the combustor at or above the auto-ignition point of the at least one hydrocarbon and hydrogen. Thus, the embodiments provided herein can provide the requisite heat to the regenerator while still avoiding unnecessary catalyst attrition.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally about 50%, and preferably about 70%, by mole, of a compound or class of compounds in a stream.

As used herein, the term "substantially" can mean an amount of at least generally about 80%, preferably about 90%, and optimally about 99%, by mole, of a compound or class of compounds in a stream.

As used herein, the term "uncombusted" can mean a stream that has not significantly undergone an exothermic oxidation reaction. A stream that has not significantly undergone exothermic oxidation can mean that less than 1%, by volume, of the stream has been combusted.

DETAILED DESCRIPTION

Figure 1:
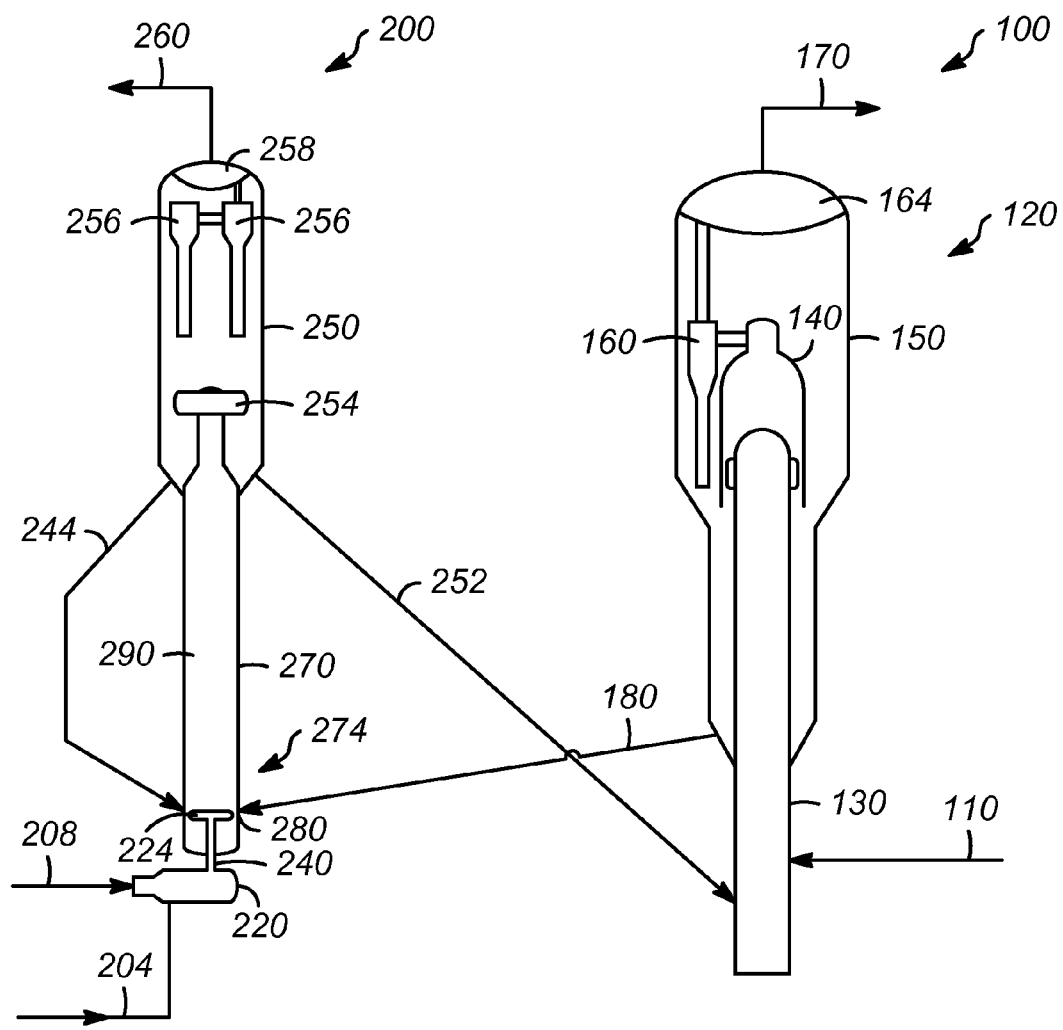
FIG. 1 is a schematic depiction of an exemplary embodiment of a fluid catalytic cracking apparatus.

Referring to FIG. 1, a fluid catalytic cracking unit 100 can include a reaction vessel 120 and a regenerator 200. In the drawings, lines and passages may be referred interchangeably as lines, grids, streams, and feeds. The reaction vessel 120 can include a riser 130 that terminates inside a chamber 140, which can be a vortex disengaging chamber to separate hydrocarbon from a catalyst. Any suitable catalyst may be utilized, including a mixture of a plurality of catalysts including an MFI zeolite and a Y-zeolite. Exemplary catalyst mixtures are disclosed in, e.g., U.S. Pat. No. 7,312,370 B2. Generally, a shell 150 surrounds the chamber 140 and at least a portion of the riser 130. The shell 150 can also contain one or more cyclone separators 160 that can be in communication with a plenum 164. Exemplary reaction vessels and regenerators are disclosed in, e.g., U.S. Pat. Nos. 7,261,807 B2; 7,312,370 B2; and US 2008/0035527 A1.

The regenerator 200 can include a heater 220, a combustor 270, and a separator 250. Typically, the heater 220 is a direct fired heater 220. Generally, the direct fired heater 220 can be used during the start-up of the fluid catalytic cracking unit 100. Afterwards, often the direct fired heater 220 is shut down during steady-state operations. The combustor 270, which may form a void 290, can extend upward terminating in a separation or distributing device 254, often with one or more arms. In addition, the separator 250 can substantially enclose the distributing device 254 and one or more cyclone separators 256 that separate entrained catalyst from one or more gases. The one or more cyclone separators 256 can, in turn, be in communication with a plenum 258 for receiving the one or more gases separated from the one or more cyclone separators 256. A line 260 can communicate a flue gas from the regenerator 200.

In addition, a spent catalyst line 180 can communicate the reaction vessel 120 with the regenerator 200 for receiving spent catalyst at an inlet 280 of the combustor 270. Regenerated catalyst can be provided by a line 252 from the separator 250 of the regenerator 200 to the riser 130 of the reaction vessel 120.

In operation, a hydrocarbon feed 110, that may include at least one of a gas oil, a vacuum gas oil, an atmospheric gas oil, a coke oil, a gas oil, a hydrotreated gas oil, a hydrocracker unconverted oil, and an atmospheric residue, can be provided to the riser 130. The hydrocarbon feed 110 can also be contacted with regenerated catalyst provided by the line 252 at the base of the riser 130. Generally, the regenerated catalyst and feed mixture can be at a temperature of about 500° to about 650° C. and a pressure of about 110 to about 450 kPa. The catalyst and feed can rise within the riser 130 and separate at the chamber 140 using any suitable device, such as swirl arms. The catalyst can fall toward the base of the shell 150 while product gases can rise and be separated from catalyst in the cyclone separator 160. The recovered catalyst falls to the base of the shell 150 while the product gases can enter the plenum 164 and exit as a product stream 170. The hydrocarbon products can be further processed, such as in downstream fractionation zones. An exemplary fractionation zone is disclosed in, e.g., U.S. Pat. No. 3,470,084.

The regenerator 200 can receive spent catalyst through the spent catalyst line 180. The spent catalyst can enter the combustor 270 at the inlet 280. Typically, the direct fired heater 220 can be activated during start-up of the regenerator 200 to provide the requisite heat for regeneration. Generally, the direct fired heater 220 can combust any suitable fuel, such as an auxiliary fuel, including a fuel gas. After reaching steady-state conditions, the direct fired heater 220 can be turned off. The combustor 270 can operate at any suitable temperature, such as above 650° C. or other suitable conditions for removing coke accumulated on the catalyst particles.

At steady-state, the direct fired heater 220 can receive a first stream 204 including oxygen, such as air, and a second stream 208 including an auxiliary fuel, such as at least one or more $C_1$-$C_5$ hydrocarbons and/or hydrogen. Often, the auxiliary fuel can be a fuel gas, although a more refined fuel such as a stream including substantially methane or propane may be used. As discussed above, the second stream 208 at start-up can be combusted to provide the requisite heat to the combustor 270. But after reaching steady-state conditions, a portion of the regenerated catalyst can be provided to the base 274 of the combustor 270 via a regenerated catalyst line 244 to provide the requisite heat. However, if insufficient coke is deposited on the spent catalyst in the line 180 to provide heat to the combustor 270, the first stream 204 and the second stream 208 can pass through the direct fired heater 220 as an uncombusted stream 240 into the combustor 270. Alternatively, if the combustor 270 has a sufficient heat duty from burning the coke on the catalyst, the second stream 208 may be shut off and the first stream 204 may pass through the direct fired heater 220 through an air grid 224 to the combustor 270. In any event, typically oxygen in the form of air is provided throughout the regeneration of the catalyst. The uncombusted stream 240 is generally not ignited prior to entering the combustor 270, and typically poses little risk of metallurgical failure to the air grid 224 positioned at the outlet of the direct fired heater 220. Furthermore, it is desirable to provide the uncombusted stream 240 below the flammability limits of unburned fuel gas and below the auto ignition temperature of the uncombusted stream 240, such as less than about 540° C., preferably about 170° to about 210° C. to prevent inadvertent combustion. In the combustor 270, the gases in the second stream 208 can ignite to provide the requisite heat without creating excessive gas velocities that may attrite the catalyst. Thus, it is desirable to prevent combustion of the uncombusted stream 240 prior to entering the combustor 270 to avoid metallurgical failure of the air grid 224.

The uncombusted stream 240 can contain any suitable gas, such as at least one or more $C_1$-$C_5$ hydrocarbons and/or hydrogen, and air. As such, it is often desirable to maintain the content of the auxiliary gas below the flammability limit of its individual components in the uncombusted stream 240. If the uncombusted stream 240 contains methane, typically, the total volume of methane is no more than about 5%, by volume, based on the volume of the uncombusted stream 240. As an example, if methane is provided to the combustor 270, the methane concentration in air may be in the range of about 1.6 to about 3.3%, by volume, based on the volume of the uncombusted stream 240, which may be below the lower flammability limit of about 5%, by volume, of methane in air. Any suitable control system can be provided to prevent the auxiliary gas from exceeding the flammability limit of the uncombusted gas, as well as suitable temperature controls.

Alternatively, if the uncombusted stream 240 contains hydrogen, the total volume of hydrogen is no more than about 4%, by volume, based on the volume of the uncombusted stream. Generally, if the uncombusted stream 240 contains one or more $C_2$-$C_5$ hydrocarbons, such as ethane, ethene, propane, propene, butane, butene, and pentene, generally the uncombusted stream 240 contains less than about 3%, by volume, of the one or more hydrocarbons. Usually, the uncombusted stream 240 can be at a temperature of about 200° to about 260° C. In addition, it is desirable that the uncombusted stream 240 is below the spontaneous ignition temperature of its individual components prior to entering the combustor 270. As an example, if the uncombusted stream 240 contains a mixture of air and methane, preferably the combination is below about 540° C.

Once the uncombusted stream 240 enters the combustor 270, the gases can combust to provide the requisite heat to regenerate the catalyst. In some preferred embodiments, generally an effective amount of the uncombusted stream 240 is communicated to provide up to about 30%, preferably about 15 to about 30%, of the heat duty required by the regenerator 200. The regenerated catalyst can rise within the combustor 270 to the separation device 254 where the catalyst can be separated from the combustion gases. In addition, the gases and any remaining fluidized catalyst can rise within the separator 250 and be received within the one or more cyclone separators 256 where additional catalyst may be separated to fall to the base of the separator 250 to be either provided to the base of the combustor 270 via the line 244 or the reaction vessel 120 via the line 252. The flue gases can escape the regenerator 200 via the line 260.

Not lighting the direct fired heater 220 can avoid excessive gas velocities at all fuel gas flow rates at the base of the combustor 270 and avoid attrition of the catalyst. Furthermore, the fuel gas can be mixed with the air stream in the direct fired heater 220 and can be distributed uniformly across the regenerator 200 to prevent localized high temperatures that may deactivate the catalyst.

Figure 2:
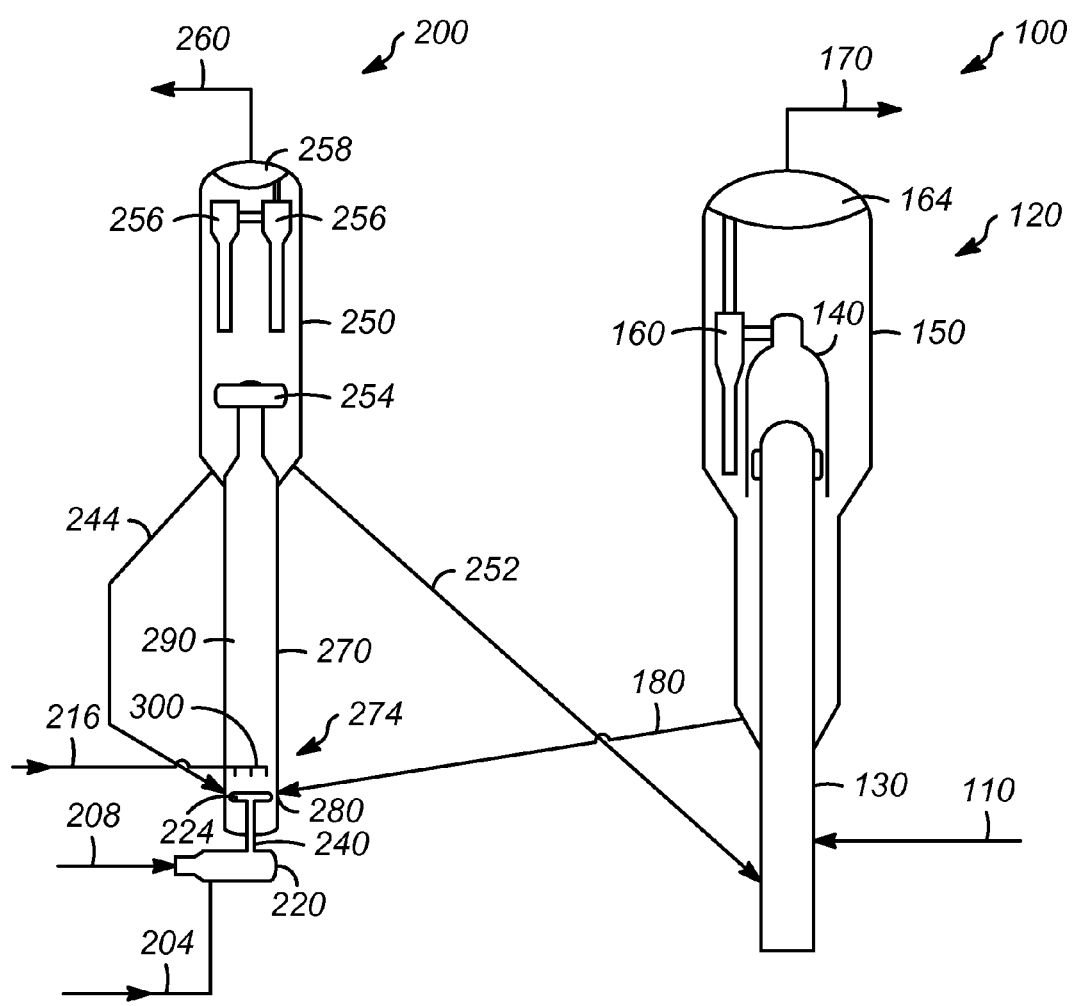
FIG. 2 is a schematic depiction of another exemplary embodiment of the fluid catalytic cracking apparatus.

In another exemplary embodiment, as depicted in FIG. 2, another version of the fluid catalytic cracking apparatus 100 is depicted. The fluid catalytic cracking apparatus 100 is essentially the apparatus 100 as described above, except primarily that a distributor 300 is positioned within the combustor 270 above the inlet 280 for the spent catalyst. Generally, the distributor 300 can take any suitable shape. As an example, the distributor 300 may simply be a pipe terminating within the void 290 having one or more orifices. Alternatively, the pipe may have one or more branches extending from the pipe wherein each branch may have one or more orifices. In yet another embodiment, the distributor may form a ring with one or more orifices positioned about a periphery, or one or more tubular extensions positioned about a periphery and each extension having one or more orifices. Exemplary distributors are disclosed in, e.g., U.S. Pat. Nos. 4,828,802; 6,797,239 B1; and U.S. Pat. No. 7,368,090 B2.

In this exemplary embodiment, the direct fired heater 220 can again be ignited during start-up receiving a first stream 204, such as air, and a fuel gas stream 208 to provide the requisite heat to initiate catalyst regeneration. After start-up, the direct fired heater 220 may be shut off.

A stream 216 including at least one or more $C_1$-$C_5$ hydrocarbons and hydrogen can be provided to the distributor 300. Generally, this stream 216 can either be a portion of the stream 208 or be provided independently to the distributor 300. Optionally, it may include oxygen that can be comprised in, e.g., air. Usually, the distributor 300 is placed within the void 290 of the combustor 270. Generally, an effective amount of the stream 216 can be communicated directly to the combustor 270 providing up to about 50%, preferably about 30% to about 50%, of the heat duty required by the regenerator 200. Desirably, the stream 216 and the catalyst in the base 274 of the combustor 270 are provided at or above the auto-ignition point of its hydrogen and/or hydrocarbon components, preferably with a sufficient buffer to ensure combustion and avoid afterburning that may result in damage to equipment downstream of the regenerator 200. As an example, the stream 216 may be provided at a temperature of about 500° to about 650° C., preferably about 600° to about 650° C. The streams 204 and 208 and the catalyst can be heated to about 425° C. using the direct fired heater 220. Afterwards, the stream 216 can be provided through the distributor 300 at the base 274 of the combustor 270, and burned to raise the combustor 270 to its desired temperature. As a result, the auto-ignition point of the components in the stream 216 can be met or exceeded in the combustor 270.

Usually, air is provided unheated into the regenerator 200. At start-up, the air may be heated with a direct fired heater 220, but once at steady-state the direct fired heater 220 can be turned off and heated catalyst from the regenerated catalyst line 244 from the top of the regenerator 200 may provide the heat to the bottom of the combustor 270. A fuel gas can be provided at the direct fired heater 220 or at the bottom of the combustor 270. When provided to the direct fired heater 220, a limit on the volume of fuel gas in the air mixture can be required, typically, about 3 to about 5%, by volume, while generally no limit is required in the combustor 270. Typically, the first stream 204 may pass through the direct fired heater 220 and through the air grid 224 to provide oxygen to the combustor 270. Generally, the first stream 204 is provided throughout regeneration whether the stream 216 is communicated for additional heat duty or not. As an example, the stream 216 may be shut-off if sufficient heat duty is provided by burning coke from the catalyst while the stream 204 is continuously provided.

Replacing heat provided by burning coke with burning, e.g., methane may reduce carbon dioxide emissions. Burning methane gas that is typically about 75%, by weight, carbon and about 25%, by weight, hydrogen in place of coke that is usually about 94%, by weight, carbon and about 6%, by weight, hydrogen can reduce carbon dioxide emissions from the regenerator 200 by about 13.1%, by volume.

Thus, the embodiments provided herein can avoid localized high temperatures and thermal damage to the catalyst. Furthermore, the embodiments disclosed herein can obtain the benefits of using clean feeds while avoiding losing product by taking alternative measures to compensate for the loss of heat in the regenerator 200, such as reducing stripping stream, increasing capital costs, or increasing operating complexity by increasing the temperature of the hydrocarbon feed 110 to the reaction vessel 120. Moreover, operating in this manner can be implemented to existing units without incurring a great deal of additional capital and/or operating costs. Unlit uncombusted gases sent to the direct fired heater 220 and distributor 300 can give a heat release of up to about 30% of the required heat required by the combustor 270.

ILLUSTRATIVE EMBODIMENTS

The following examples are intended to further illustrate the subject process. These illustrations of embodiments of the invention are not meant to limit the claims of this invention to the particular details of these examples. These examples are based on engineering calculations and actual operating experience with similar processes. In these prophetic examples, the results of adding combusted and uncombusted methane are compared.

EXAMPLE 1 (COMPARISON EXAMPLE)

In this example, methane is ignited in a direct fired heater and provided to a combustor. The heat of combustion of coke (94%, by weight, carbon; 6%, by weight, hydrogen) is 9,100 kcal/kg and the direct fired heater is limited to 15% of the heat released from the regenerator because of the outlet temperature limitation of the air grid of about 750° to about 790° C.

TABLE 1

| Parameter | Value |
| --- | --- |
| Air Temperature from Main Air Blower | 230° C. |
| Air Temperature from Direct Fired Heater | 680° C. |
| Heat Capacity of Air | 0.25 kcal/kg-° C. |
| Air Delta Enthalpy of Air dH | 110 kcal/kg |
| Air/Coke | 14 kg/kg |
| Air Delta Enthalpy Per Unit of Coke | 1,560 kcal/kg |
| Effective Heat of Combustion per Unit of Coke | 10,630 kcal/kg |
| Coke Yield | 5%, by weight |
| Heat Release for 5%, by Weight, Coke | 45,380 kcal |
| Coke Burned with Direct Fired Heater in Operation | 4.27 kg |
| Coke Reduction | 0.73 delta %, by weight |
| Coke Reduction (Replacement) | 14.63%, by weight |
| dH Comb of Methane | 11,950 kcal/kg |
| Methane Fired | 0.65 kg |
| Moles of Air | 2.43 mole |
| Moles of Methane | 0.04 mole |
| Mole % Methane in Dry Air | 1.68%, by mole |

EXAMPLE 2

Unlit methane is provided to a direct fired heater with a lower flammability limit at 25° C. and an upper limit at 232° C. in air. The methane is present in air at 3%, by volume, based on the total volume of methane and air. The unlit gas to the direct fired heater is limited to 30% of the heat released from the regenerator. Parameters are depicted in Table 2:

TABLE 2

| Parameter | Value |
| --- | --- |
| Moles of Air | 2.43 mole |
| Moles of Methane | 0.07 mole |
| Mole % Methane in Dry Air | 3.00 mole % |
| Methane Flow Rate | 1.17 kg/hr |
| Methane Heat Release | 13,920 kcal |
| Methane Heat Release (kg of Coke Equivalent | 1.53 kg |
| Kg of Coke Required to be Burned to Keep Same Total of Heat Release | 3.47 kg |
| Coke Reduction | 1.53 delta %, by weight |
| Coke Reduction (Replacement) | 30.67%, by weight |

EXAMPLE 3

Unlit methane is provided to a direct fired heater with a limit of a spontaneous ignition temperature.

TABLE 3

| Parameter | Value |
| --- | --- |
| Spontaneous Ignition Temperature of Methane | 540° C. |
| Combustor Temperature Required Before Adding Methane | 590° C. |
| Safety Margin | at least 40° C. |

Generally, if more than about 30% of the regenerator heat needs to be provided by an auxiliary fuel, then it is generally preferred that the auxiliary fuel is added directly to the combustor to avoid flammability thresholds.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for regenerating catalyst in a fluid catalytic cracking unit, comprising:
    A) providing a feed comprising at least one of a gas oil, a vacuum gas oil, an atmospheric gas oil, a coker gas oil, a hydrotreated gas oil, a hydrocracker unconverted oil, and an atmospheric residue to a riser of a reaction vessel; and
    B) providing an uncombusted stream of at least one or more $C_1$-$C_5$ hydrocarbons, an auxiliary fuel and/or hydrogen to a distributor positioned within a void in a regenerator proximate to an inlet receiving unregenerated catalyst in the regenerator.

2. The process according to claim 1, wherein the regenerator comprises a separator and a combustor, wherein the distributor is positioned within the void of a base of the combustor.

3. The process according to claim 2, wherein the separator substantially encloses a distributing device and one or more cyclone separators.

4. The process according to claim 1, wherein the stream comprises an auxiliary fuel.

5. The process according to claim 1, wherein the catalyst comprises a plurality of catalysts.

6. The process according to claim 5, wherein the plurality of catalysts comprises an MFI zeolite and a Y-zeolite.

7. The process according to claim 1, wherein the regenerator further comprises a heater.

8. The process according to claim 7, wherein the heater receives an auxiliary fuel stream for heating a stream comprising air.

9. The process according to claim 8, wherein the heated air stream is provided to the regenerator proximate to the inlet.

10. A process for regenerating catalyst in a fluid catalytic cracking unit, comprising:
   A) providing a feed comprising at least one of a gas oil, a vacuum gas oil, an atmospheric gas oil, a coker gas oil, a hydrotreated gas oil, a hydrocracker unconverted oil, and an atmospheric residue to a riser of a reaction vessel; and
   B) providing an uncombusted stream of an auxiliary fuel to a distributor positioned within a void in a regenerator proximate to an inlet receiving unregenerated catalyst in the regenerator, wherein the catalyst comprises a plurality of catalysts comprising an WI zeolite and Y-zeolite.

11. The process according to claim 10, wherein the regenerator comprises a separator and a combustor, wherein the distributor is positioned within the void of a base of the combustor.

12. The process according to claim 11, wherein the separator substantially encloses a distributing device and one or more cyclone separators.

13. The process according to claim 10, wherein the stream comprises at least one of one or more $C_1$-$C_5$ hydrocarbons and hydrogen.

14. The process according to claim 10, wherein the heated air stream is provided to the regenerator proximate to the inlet.

* * * * *